United States Patent [19]
Nagai et al.

[11] Patent Number: 5,193,796
[45] Date of Patent: Mar. 16, 1993

[54] APPARATUS FOR HOLDING BY SUCTION AND CONVEYING A SUCTION PAD CONSTRUCTED OUT OF MATERIALS OF DIFFERING HARDNESSES

[75] Inventors: Shigekazu Nagai; Shuuzou Sakurai; Tadasu Kawamoto, all of Ibaraki, Japan

[73] Assignee: SMC Kabushiki Kaisha, Tokyo, Japan

[21] Appl. No.: 757,044

[22] Filed: Sep. 9, 1991

[30] Foreign Application Priority Data

Sep. 11, 1990 [JP] Japan .................................. 2-242019
Jun. 24, 1991 [JP] Japan .................................. 3-047698

[51] Int. Cl.⁵ ............................................. B65H 3/08
[52] U.S. Cl. ...................................... 271/90; 294/64.1
[58] Field of Search ......................... 271/90; 294/64.1

[56] References Cited

U.S. PATENT DOCUMENTS

| | | | |
|---|---|---|---|
| 2,850,279 | 9/1958 | Stoothoff et al. | 294/64.1 |
| 3,542,224 | 11/1970 | Warren . | |
| 3,592,336 | 7/1971 | Hartford et al. . | |
| 3,656,794 | 4/1972 | McCord . | |
| 3,934,916 | 1/1976 | Baker | 294/64.1 |
| 4,600,229 | 7/1986 | Oten | 294/64.1 |
| 4,712,818 | 12/1987 | Borgman et al. . | |
| 4,749,219 | 6/1988 | Bolle, Jr. et al. | 294/64.1 |
| 4,787,812 | 11/1988 | Gopfert . | |
| 5,033,730 | 7/1991 | Davies et al. | 294/64.1 |

FOREIGN PATENT DOCUMENTS

| | | |
|---|---|---|
| 0302221 | 2/1989 | European Pat. Off. . |
| 2263732 | 2/1974 | Fed. Rep. of Germany ..... 294/64.1 |
| 3631270 | 3/1988 | Fed. Rep. of Germany . |
| 3713037 | 10/1988 | Fed. Rep. of Germany ........ 271/90 |
| 1308796 | 3/1973 | United Kingdom . |
| 1325119 | 8/1973 | United Kingdom . |

*Primary Examiner*—Robert P. Olszewski
*Assistant Examiner*—Steven M. Reiss
*Attorney, Agent, or Firm*—Oblon, Spivak, McClelland, Maier & Neustadt

[57] ABSTRACT

Disclosed herein is an apparatus for holding by suction and conveying, making use of a suction pad for holding a work by suction. The apparatus is characterized in that the suction pad comprises a root part to be connected to a vacuum and suction source and a skirt part provided integrally with the root part, and a cushioning part is provided integrally between the root part and the skirt part.

19 Claims, 10 Drawing Sheets

APPARATUS FOR HOLDING BY SUCTION AND CONVEYING A SUCTION PAD CONSTRUCTED OUT OF MATERIALS OF DIFFERING HARDNESSES

FIELD OF THE INVENTION

The present invention relates to an apparatus for holding by suction and conveying (hereinafter may be referred to as "suction and conveying apparatus", which serves to hold a work by suction and then convey it).

BACKGROUND OF THE INVENTION

In order to convey, for example, works in the form of a thin plate, there has heretofore been used suction and conveying apparatus in which a suction pad to be connected to a vacuum and suction source has been incorporated.

The suction pad is generally installed on an arm of a robot. When it is accurately moved to a position where its skirt part comes into contact with a work, the work is held by suction under a pressure reducing effect within the skirt part.

DESCRIPTION OF THE PRIOR ART

A suction pad 2 according to such prior art is illustrated in FIG. 1. According to this suction pad 2, an adapter 8, in which a passage communicating with a vacuum and suction source (not illustrated) has been cleared, is integrally fitted in a root part 6. The end portion of a skirt part 4 is brought into contact with a work to hold it by suction under a pressure reducing effect within the skirt part 4. After the holding, the work is conveyed, for example, to a predetermined position.

The conventional suction pad 2 however has the following disadvantages. For example, when a great number of works stacked are conveyed one by one, the stacking height of the works becomes gradually low due to their repeated holding by suction and conveying. When the stacking height of the works becomes lower than a certain limit, an edge of the suction pad 2 is difficult to contact with a work positioned uppermost. As a result, it is difficult to exert a sucking action on the work. In other words, the suction pad 2 held by a hand of a robot (not illustrated) can not reach any work when the stacking height of works to be conveyed varies, because the robot moves only after teaching. Therefore, it is also impossible to give a sucking effect to the work. Accordingly, it has been conducted to remeasure the position of the remaining works every holding by suction and conveying or every several times so as to adjust them to an optimum position, or to lift a work forcedly so as to conform it to the position of the suction pad 2.

When works are arranged with a gradient, it is impossible to bring the periphery of the skirt part of the suction pad into close contact with a work, so that sufficient suction force can not be obtained. Therefore, a desired sucking effect can not be achieved. For this reason, the work held by suction has a potential problem that it falls off in the course of its conveying. In addition, when it is attempted to position the skirt part parallel to the inclined work in order to convey the work, the teaching to the hand of the robot, which holds the suction pad, is complicated.

Furthermore, there is a potential problem that upon conveying a work, the suction pad is charged with static electricity caused by friction and/or the like in connection with the material of the work. Therefore, when such a suction pad comes into contact with the next work, the work is damaged by the static electricity. For this reason, as a measure to counter the static electricity, it has been conducted to mold a suction pad from a conductive rubber and to put the suction pad to earth through a conductive adapter fitted in the root part of the suction pad.

Such prior art is however accompanied by a potential problem that flexible resins usable are limited because the suction pad is molded from a conductive rubber. In addition, since the rubber of the suction pad is high in wearability, the holding portion of the suction pad is worn as the duration of service goes on, resulting in reduced suction force. When a rubber other than any conductive rubber is used in the suction pad on the other than, static electricity can not be always discharged through the adapter fitted in the root part if the suction pad is charged with the static electricity. The static electricity hence remains in the suction pad. When the suction pad comes into contact with a work in this condition, the work may involve a disadvantage due to the static electricity in some cases. For example, when a printed board on which an IC is mounted is held by suction and conveyed, the IC is destroyed by the high-voltage static electricity charged on the suction pad. When each of thin-film products made of a vinyl resin is held by suction and conveyed on the other hand, the thin-film products stacked adhere closely to one another due to the static electricity, so that the conveyance is adversely affected such as a plurality of thin-film products are conveyed at once.

SUMMARY OF THE INVENTION

It is a general object of this invention to provide a suction and conveying apparatus in which a cushioning part is provided between a skirt part and a root part, which are component parts constructing a suction pad, so as to permit free displacement of the bottom edge of the skirt part, so that the suction pad can reliably hold a work by suction even when works are arranged with a gradient, or the stacking height of the works becomes lower than a predetermined level, and that the work is hard to separate from the suction pad even when the work is vibrated in the course of the conveyance.

It is a principal object of this invention to provide a suction and conveying apparatus comprising a suction pad which permits preventing it from being charged with static electricity for a long period of time as much as possible without depending upon the quality of a rubber as a raw material, so that any works are not damaged and it is avoidable to convey a plurality of works at once.

Another object of this invention is to provide a suction and conveying apparatus wherein an internal thread is cut in an inner surface of a cylindrical root part, which is a component part constructing a suction pad, whereby the height of the suction pad can be vertically adjusted while fixing an arm of a robot as it is.

A further object of this invention is to provide a suction and conveying apparatus, which is low in cost and light in weight, by molding an adapter for a suction pad from a plastic or another light-weight metal.

Still a further object of this invention is to provide a suction and conveying apparatus making use of a suction pad for holding a work by suction, characterized in that the suction pad comprises a root part to be connected to a vacuum and suction source and a skirt part provided integrally with the root part, and a cushioning part is provided integrally between the root part and the skirt part.

Yet still a further object of this invention is to provide a suction and conveying apparatus wherein the hardness of at least the cushioning part on the side of the root part is higher than that on the side of the skirt part.

Yet still a further object of this invention is to provide a suction and conveying apparatus wherein the cushioning part comprises an upper portion gradually expanded downward from the side of the root part, a lower portion gradually expanded upward from the side of the skirt part, and an annular projection which joins the upper portion of the cushioning part to the lower portion of the cushioning part.

Yet still a further object of this invention is to provide a suction and conveying apparatus wherein the hardness of the annular projection is higher than that of the lower portion of the cushioning part.

Yet still a further object of this invention is to provide a suction and conveying apparatus wherein the hardness of the annular projection is equal to that of the upper portion of the cushioning part.

Yet still a further object of this invention is to provide a suction and conveying apparatus further comprising a positioning means capable of displacing the position of the suction pad itself along an axial direction of the root part.

Yet still a further object of this invention is to provide a suction and conveying apparatus wherein the adapter is fitted in the root part of the suction pad and has a through-hole communicating with a hole bored in the root part, said adapter being molded from a plastic.

Yet still a further object of this invention is to provide a suction and conveying apparatus wherein the material of the adapter is a conductive plastic.

Yet still a further object of this invention is to provide a suction and conveying apparatus wherein the adapter has been plated with a metal.

Yet still a further object of this invention is to provide a suction and conveying apparatus wherein both root part and skirt part of the suction pad are formed of a flexible resin, and a metallic fiber material is incorporated in the flexible resin.

Yet still a further object of this invention is to provide a suction and conveying apparatus wherein the suction pad is integrally molded from the flexible resin composing the root part and skirt part, and the metallic fiber material.

Yet still a further object of this invention is to provide a suction and conveying apparatus wherein a part of the metallic fiber material is exposed out of at least the top of the root part and the inner surface of the skirt part in the suction pad.

Yet still a further object of this invention is to provide a suction and conveying apparatus wherein the metallic fiber material is applied to the inner wall surface defining the through-hole bored in the root part along its axial direction and the inner surface of the skirt part in the suction pad.

Other objects and advantages of the present invention will be readily appreciated from the preferred embodiments of this invention, which will be described subsequently in detail with reference to the accompanying drawings.

DETAILED DESCRIPTION OF THE PREFERRED EMBODIMENTS

Figure 1:
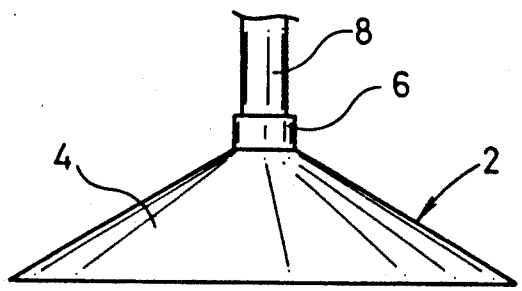
FIG. 1 is a side elevational view of a suction pad according to the prior art.
Figure 2:
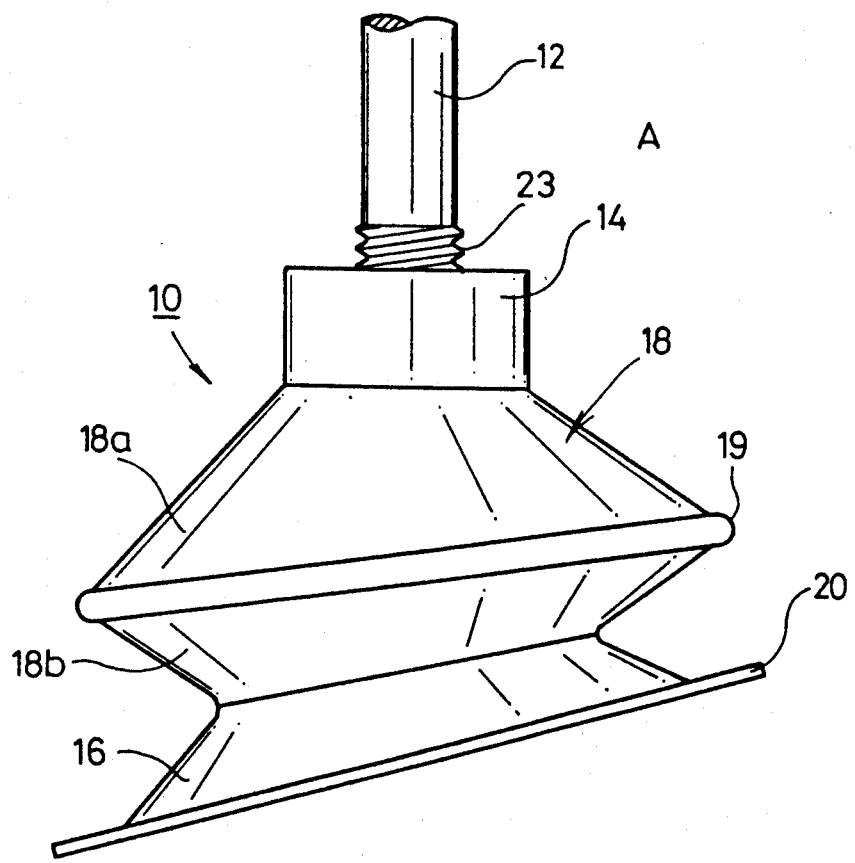
FIG. 2 is a side elevational view of a suction pad according to one embodiment of the present invention.
Figure 3:
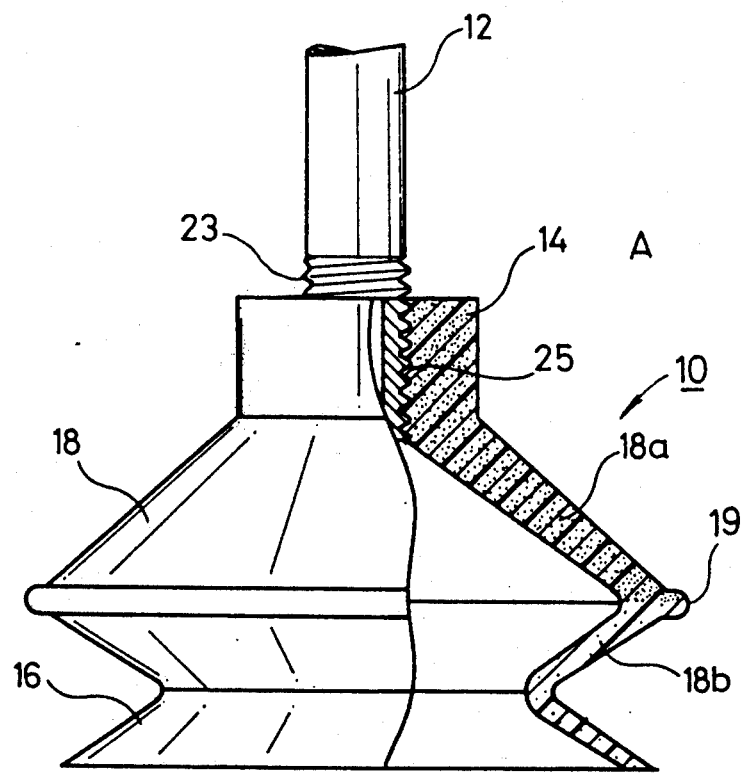
FIG. 3 is a side elevational view partly in section of the suction pad of FIG. 1.

In FIGS. 2 and 3, reference character A designates a suction and conveying apparatus including a suction pad 10 according to the present invention.

The suction pad 10 is installed on an adapter 12 and comprises a root part 14, a skirt part 16 and a cushioning part 18 provided between the root part 14 and the skirt part 16. By the way, an annular projecting part 19 protruding outside is integrally provided at a joint between an upper portion 18a of the cushioning part 18 and a lower portion 18b thereof.

Namely, in this suction pad 10, the upper portion 18a of the cushioning part 18 is formed so as to conically expand from the root part 14 and the annular projecting part 19 is formed on the lower end of the upper portion 18a. The lower portion 18b of the cushioning part 18 is then provided in junction with the annular projecting part 19 so as to constrict in the form of an inverted cone downward from the annular projecting part 19. This lower portion 18b is joined to the skirt part 16.

At this time, the root part 14 and the upper portion 18a of the cushioning part 18 are formed so as to have a hardness (for example, Vickers hardness) higher than that of the lower portion 18a of the cushioning part 18 or the skirt part 16. Preferably, this difference in hardness may be raised by controlling the devulcanization upon integral molding of the suction pad 10 or incorporating a hardness-increasing material upon its molding. Upon the molding, the root part 14 and the upper portion 18a of the cushioning part 18 may be integrally molded first of all and then, a melt for molding the lower portion 18b of the cushioning part 18 and the skirt part 16 may be cast in the same mold at the time the melt for the first mentioned parts has become a suitable temperature prior to its curing.

In this case, the adapter 12 is basically an electric conductor, is hence plated with a metal or composed of a relatively light-weight and hard material such as a conductive plastic or aluminum, and is formed in the shape of a cylinder. An external thread 23 is cut in the outer periphery of the adapter 12, while an internal thread 25 in which the external thread 23 is threaded is cut in the root part 14.

The suction pad 10 incorporated in the suction and conveying apparatus according to this invention is basically constructed as described above. Its operation will now be described.

In FIGS. 2 and 3, the external thread 23 of the adapter 12 is threaded in the internal thread 25 of the root part 14 to adjust the position of the adapter 12 in advance. Upon this, when a surface of a work 20 to be held by suction is inclined, it is possible for the bottom edge of the skirt part 16 to come into parallel contact with the whole surface of the work 20 to be sucked because the cushioning part 18 bends when a portion of the skirt part 16 is brought into contact with the inclined surface of the work 20 even if the adapter 12 held by, for example, a hand of a robot (not illustrated) is vertically lowered from above. The work 20 can therefore be held by suction under a pressure reducing effect within the skirt part 16 through the adapter 12 in which a passage communicating with a vacuum and suction source (not illustrated) has been cleared.

In the suction pad 12 illustrated in FIG. 3, the root part 14 and the upper portion 18a of the cushioning part 18 are formed so as to have a hardness higher than that of the lower portion 18a of the cushioning part 18 and the skirt part 16. Accordingly, the root part 14 and the upper portion 18a of the cushioning part 18 provided in junction with the root part 14 are rigid and strong, and have strength sufficient to convey the work 20 after holding it by suction. On the other hand, the skirt part 16 and the lower portion 18b of the cushioning part 18 provided in junction with the skirt part 16 are flexible and hence permits the holding of the work 20 by suction.

Another use of the suction pad as a constituent part of the suction and conveying apparatus A according to the present invention will hereinafter be described with reference to FIGS. 4a and 4b.

Figure 4A:
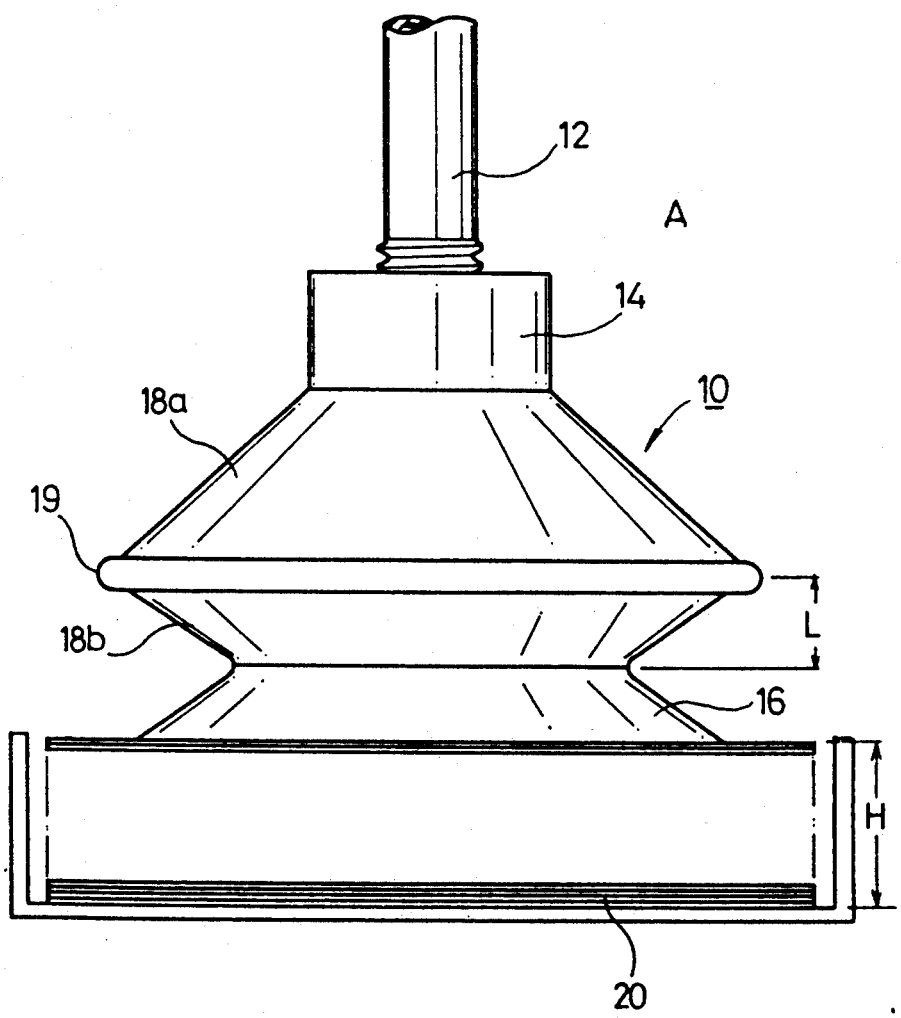
FIGS. 4a and 4b are side elevational views illustrating another use of the suction pad according to the embodiment of the present invention.
Figure 4B:
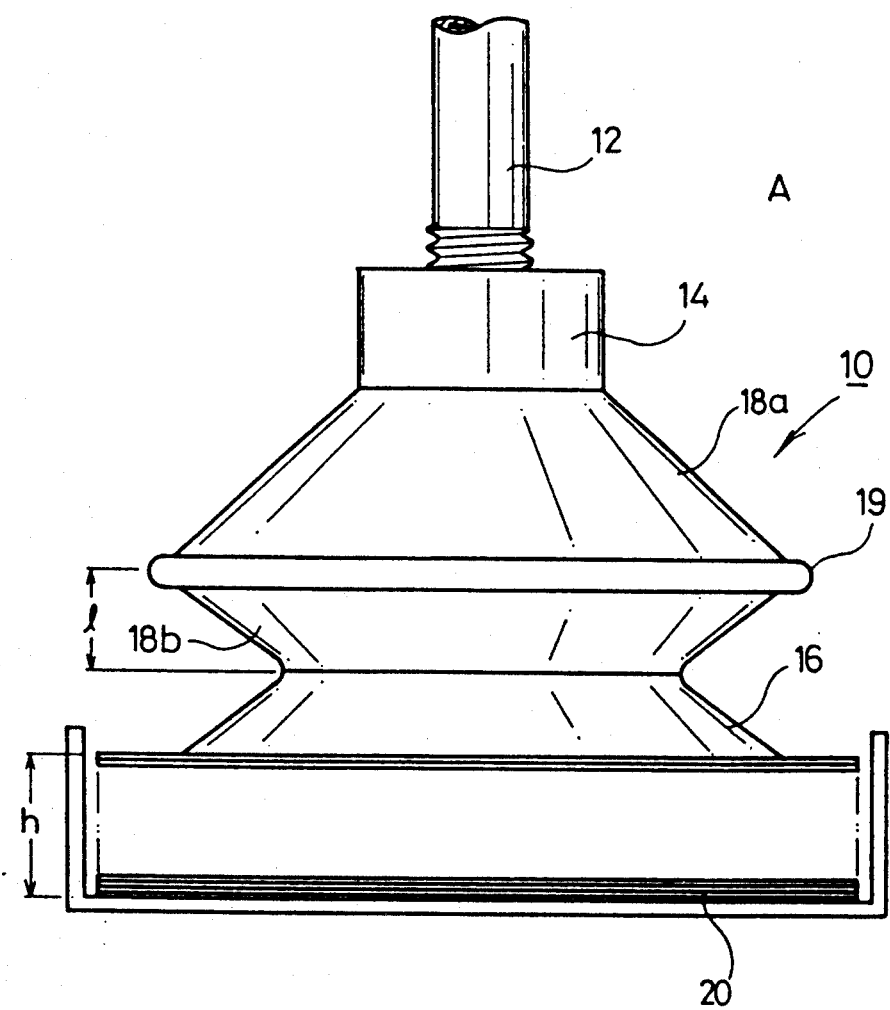

In FIG. 4a, the height of works 20 is supposed to be H, while the height of the lower portion 18b of the cushioning part 18 is assumed to be L. The lower portion 18b is in a state of bending at first. As illustrated in FIG. 4b, the height of the works 20 is gradually low as the works 20 are successively held by suction and conveyed. However, the bottom edge of the skirt part 16 can be brought into contact with the surface of the work 20 without changing the position of an arm of a robot (not illustrated) because the lower portion 18b of the cushioning part 18 is stretched by its gravity. As a result, it is possible to hold the work 20 by suction without specially conducting the teaching relating to the position of the arm of the robot.

On the other hand, when the cushioning part 18 can not cope with the change in the height of the works 20 as described above, it is only necessary to suitably turn the external thread 23 of the adapter 12 against the internal thread 25 of the root part 14 so as to adjust the height of the adapter 12.

Another embodiment of the suction and conveying apparatus according to the present invention will hereinafter be described with reference to FIGS. 5 and 6. By the way, the same reference characters are given to the same constituent parts as those in the above-described embodiment, and their detailed description will be omitted. The same shall apply hereinafter.

Figure 5:
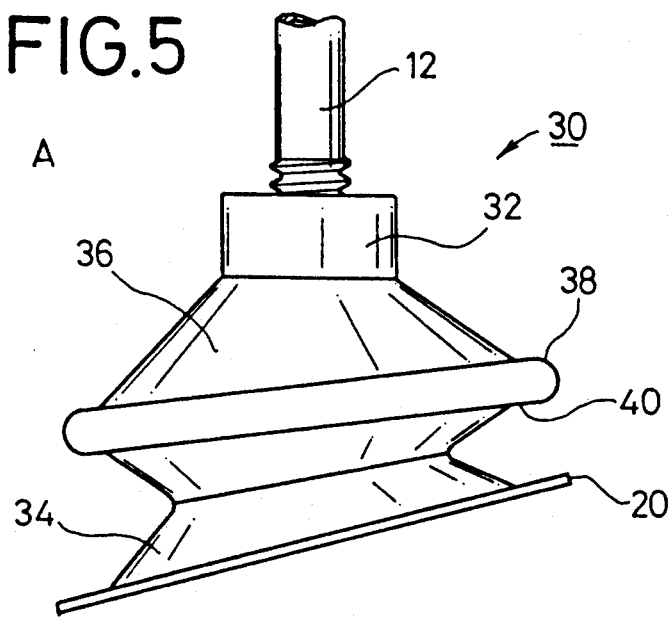
FIG. 5 is a side elevational view of a suction pad according to another embodiment of the present invention.
Figure 6:
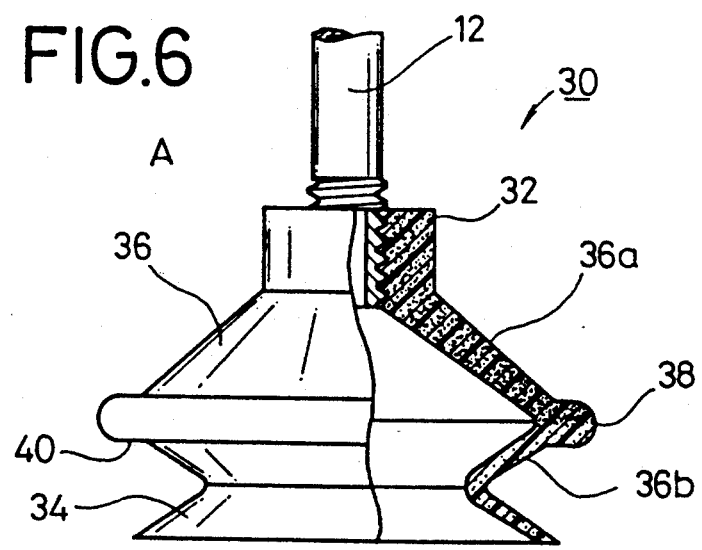
FIG. 6 is a side elevational view partly in section of the suction pad of FIG. 5.

Referring now to FIGS. 5 and 6, a suction pad 30 comprises a root part 32, a skirt part 34 and a cushioning part 36 provided between the root part 32 and the skirt part 34 as described in the above embodiment. Their parts are integrally formed. Between an upper portion 36a of the cushioning part 36 and a lower portion 36b thereof, is provided an annular projecting part 38 formed so as to protrude outside and having a thickness greater than that of the skirt part 34.

The suction pad 30 according to another embodiment of this invention is basically constructed as described above. Its operation will now be described.

Its basic operation is the same as in the above-described embodiment, and the detailed description thereof will hence be omitted. Since the thick-walled annular projecting part 38 is provided at a joint between the upper portion 36a of the cushioning part 36 and the lower portion 36b thereof as illustrated in FIG. 6, a work 20 can be held by suction with higher reliability compared to the above-described embodiment. The reason is that when the skirt part 34 is displaced according to the angle of the work 20 placed so as to run parallel with its surface to be sucked to hold the work 20 by suction, a portion of the lower surface 40 of the annular projecting part 38 provided on the upper side of the skirt part 34 comes into contact with the work 20, whereby force to displace the work 20 in a horizontal direction acts on. An additional reason is that upon holding the work 20 by suction, the skirt part 34 is bent to come into contact with the lower portion 36b of the cushioning part 36, so that a portion of the skirt part 34 is folded in the lower surface 40 of the annular projecting part 38. Accordingly, the lower surface 40 of the cushioning part 38 forms a suitable holding posture, so that balance is not lost upon holding and releasing the work 20. In addition, the annular projecting part 38 has a merit that when the skirt part 36 comes into contact with, for example, a work 20 placed at an unreasonable angle, the work 20 does not run parallel with the annular projecting part 38, so that the work 20 is prevented from being held by suction in an unreasonable posture. Furthermore, the thickening of the annular projecting part 38 brings about an effect to prevent the annular projecting part 38 from being cracked in its inner periphery, thereby more increasing the durability of the suction pad 30.

In addition, when the hardness of the annular projecting part 38 is made either equal to that of the root part 32 and the upper portion 36b of the cushioning part 36 (see FIG. 6) or higher than that of the skirt part 34 and the lower portion 36b of the cushioning part 36, the holding surface of the suction pad 30 gets to fit the surface of the work 20, so that it is possible to assume a more stable holding posture.

Figure 7:
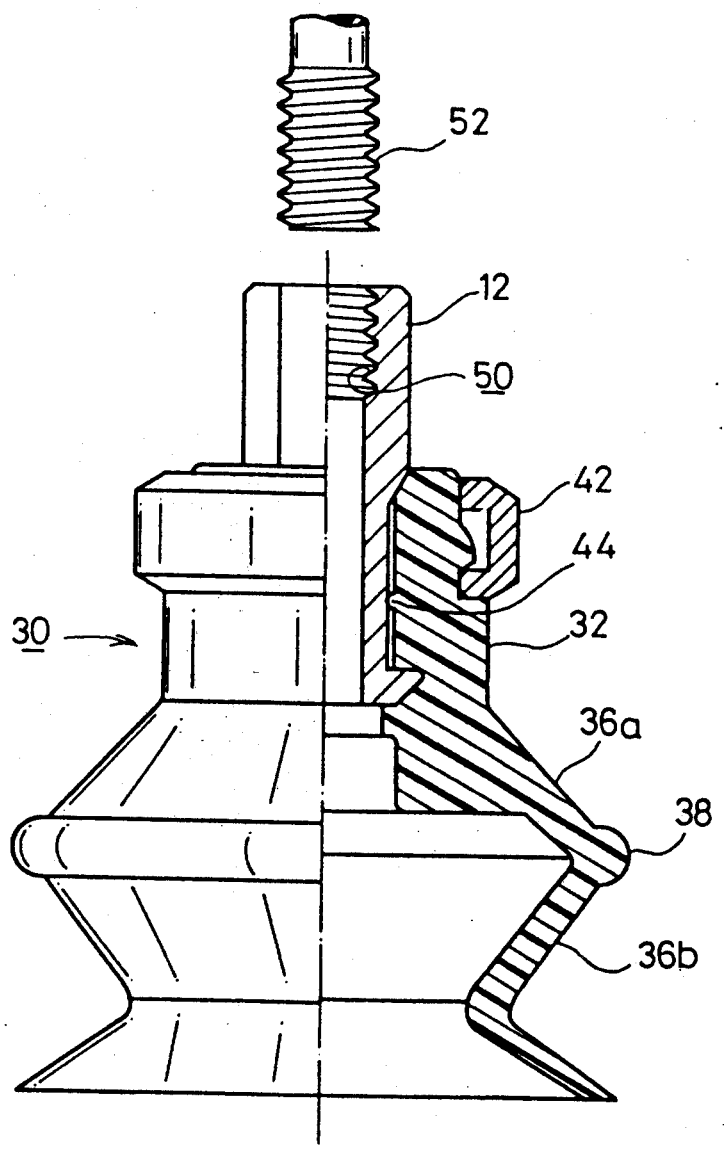
FIG. 7 is a side elevational view partly in section of a suction pad according to a further embodiment of the present invention.

In order to prevent the adapter 12, which is a fitting, from slipping through the suction pad 30, as illustrated in FIG. 7, it is only necessary to fit a locking ring 42 on the upper outer periphery of the root part 32 to fasten the adapter 12. In this case, the external thread 23 is not cut in the outer periphery of the adapter 12 unlike the above-described embodiment Therefore, in order to adjust the height of the suction pad 30 relative to the works 20 stacked, an internal thread 50 may be cut in the adapter 12 to thread an external thread 52 extending from a robot hand (not illustrated) therein. A pressure reducing effect occurs in the inner wall surface of the root part 32 when the work 20 is held by suction. In order to prevent air from leaking out of the adapter 12 joined to the root part 32 at that time, it is preferable to provide a rib 44 annularly protruding on the root part 32. It is needless to say that a plurality of ribs 44 may be arranged along the axial direction of the adapter 12. In addition, it is considered to have the suction pad 30 possess an angular joint, cushioning material against works and connector to a cylinder.

Figure 8:
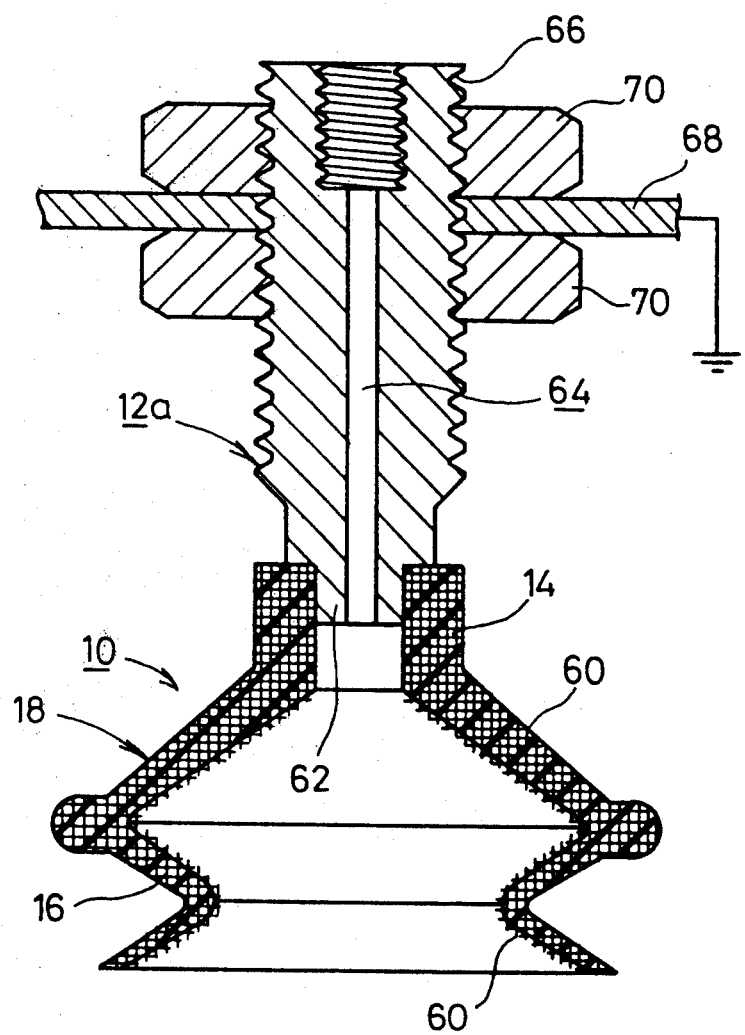
FIG. 8 is a side elevational view partly in section of a suction pad according to still a further embodiment of the present invention.

A further embodiment of the suction and conveying apparatus according to the present invention will hereinafter be described with reference to FIGS. 8 and 9. In this embodiment, the same reference characters are also given to the same constituent parts as those in the above-described embodiments, and their detailed description will be omitted.

In this embodiment, a suction pad 10 is integrally molded from a flexible resin. At this time, a metallic fiber material 60 is incorporated in the resin in advance. The metallic fiber material 60 is in the form of a mesh or fabric by way of example, and is formed according to the shape of the suction pad 10. As a result, a part of the metallic fiber material 60 is exposed out of the top of a root part 14, the inner wall defining a through-hole along the axial direction of the root part 14 and the inner surface of a skirt part 16.

Upon assembly, an adapter 12a composed of, for example, light-weight aluminum or the like, which is in the form of a cylinder and electrically conductive, is fitted to the root part 14. In this adapter 12a, a cylindrical projection 62 is formed on one end thereof, through-hole 64, which communicates with the hole of the root part 14 at its one end and has a threaded hole at the other end, is cut therein, and a thread groove 66 is cut throughout the outer surface of the adapter 12a except for the projection 62. A conductive fitting plate 68 for connecting to an arm of a robot (not illustrated) is fitted on the outer surface of the adapter 12a and held by nuts 70.

When the adapter 12a is fitted in the root part 14, it is electrically connected to the metallic fiber material 60 exposed out of the top of the root part 14 and the inner wall defining a through-hole along the axial direction of the root part 14 and is put to earth through the conductive fitting plate 68.

The operation of the suction and conveying apparatus constructed as described above will now be described.

Upon holding a work by suction, there is in some cases a potential problem that the suction pad 10, in particularly, the inner surface of the skirt part 16 is charged with static electricity.

In such a case, the static electricity is caused to flow to the metal fiber material 60 positioned at the top of the root part 14 through the metal fiber material 60 exposed out of the inner surface of the skirt part 14, and then discharged through the conductive adapter 12a and the fitting plate 68.

Therefore, when a printed board on which an IC is mounted is conveyed by way of example, it is possible to prevent the IC from being destroyed by the static electricity.

Figure 9:
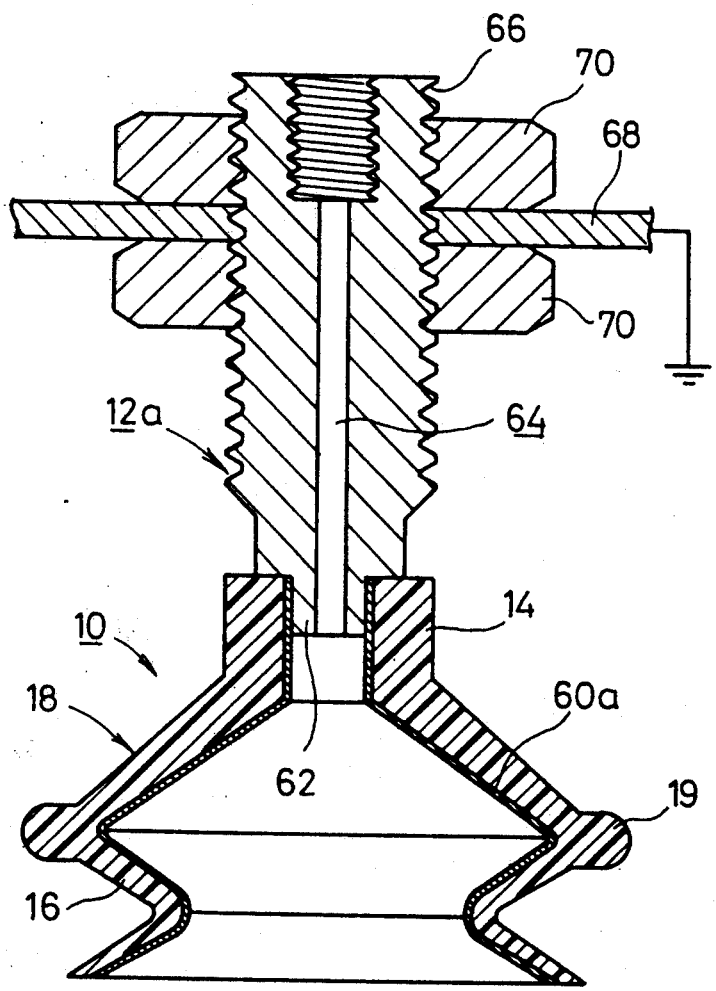
FIG. 9 is a side elevational view partly in section of a suction pad according to yet still a further embodiment of the present invention.

In still a further embodiment of this invention, a suction pad 10 has a metallic fiber material 60a in the form of a thin plate, which has been formed in advance according to the internal configuration of a skirt part 16 as illustrated in FIG. 9.

Therefore, in this suction pad 10, conductor portions are formed at inner wall surfaces of a root part 14 and the skirt part 16. When the suction pad 10 is charged with static electricity due to causes such as friction, the static electricity is discharged through a conductive adapter 12a and a fitting plate 68, both, fitted on the root part 14 from the conductor portions. It is hence possible to achieve the same effect as in the preceding embodiment.

In the different embodiments described above, it is difficult to sufficiently achieve the sucking effect if flashes, which may be generated upon molding, remain on the inner surface of the skirt 16 of the suction pad 10 or 30.

Figure 10:
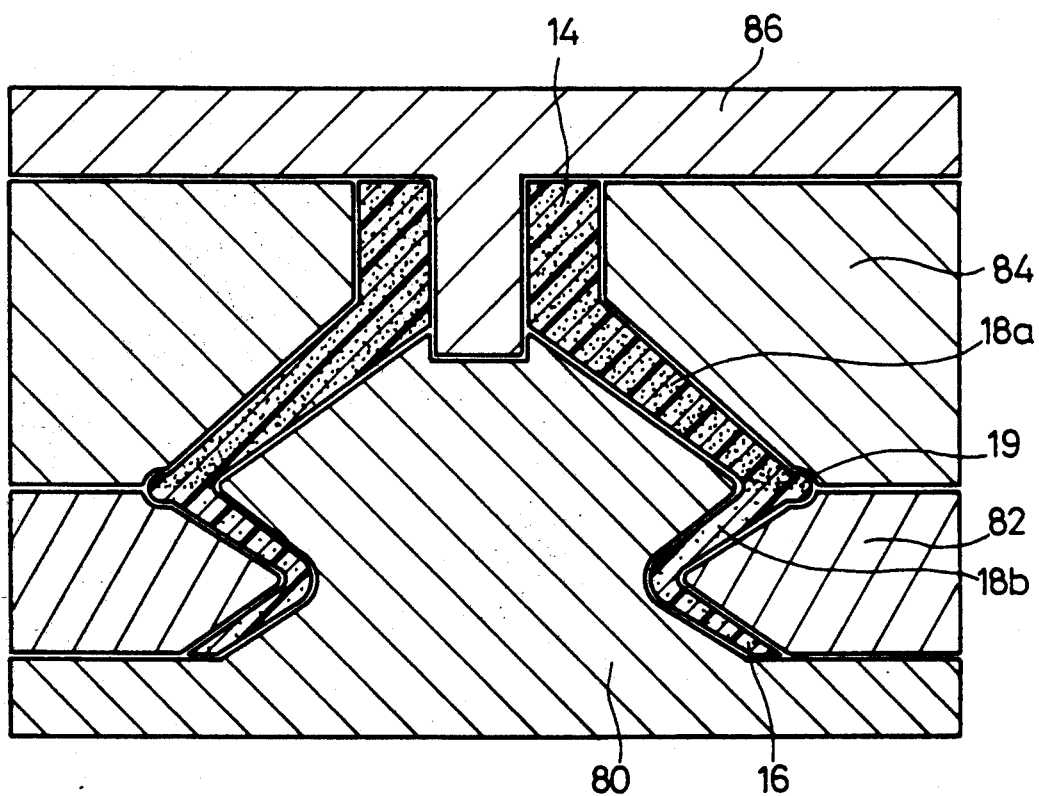
FIG. 10 is a vertical sectional view of a mold suitable for use in molding a suction pad according to the present invention.

In order to avoid such a problem, it is preferable to use, for example, a mold as illustrated in FIG. 10. Namely, this mold comprises a cavity side part 80, slide molds 82, 84 and a force side part 86. The slide molds 82, 84 are split-cavity molds and slide in a lateral direction in the drawing.

After the molding of the suction pad 10 or 30, the force side part 86 and the slide molds 82, 84, which are top forces, are opened to remove a resulting molding. Undercuts involve no particular problem because the molding is a flexible member high in elasticity.

By using such a mold, it is possible to obtain suction pads free of any flashes on their holding surfaces.

As described above, the suction and conveying apparatus according to the present invention has the following effects and advantages.

Namely, if the surface of a work to be held by suction is inclined, the work can be held by suction so long as the suction pad according to the present invention is used. In addition, if the height of works stacked is changed due to their successive conveying under suction, they can be satisfactorily held by suction owing to the presence of the cushioning part. Furthermore, if the work is vibrated in the course of its conveying, it is possible to prevent the work from falling from the suction pad because the cushioning part absorbs the vibration. As a result, there is an advantage that the teaching to the arm of the robot, on which the suction pad is installed, can be made easy.

When the position of the suction pad set up delicately deviates from the height of works stacked and a work can not hence be satisfactorily held by suction, it is also possible to bring the suction pad into contact with the work by suitably turning the suction pad with the arm of the robot fixed, thereby turning the adapter relative to the root part. Therefore, the teaching operation of the arm of the robot can be simplified.

Since the adapter is molded from a conductive plastic or light-weight metal, it is possible to produce a suction and conveying apparatus far light in weight and low in cost compared with those making use of an adapter molded from a usual metallic material.

By using the adapter molded from a conductive plastic or plated with a metal, static electricity charged on the suction pad is caused to flow to the adapter like the adapter made of a metal without adversely affecting the work, thereby discharging it therefrom. Therefore, if the work is an IC, its circuit is not destroyed by the static electricity.

By providing the annular projecting part between the upper portion of the cushioning part and the lower portion thereof, it is possible to prevent a work from being held by suction in an unreasonable posture. Furthermore, the annular projecting part comes into contact with the work upon holding the work, whereby it is possible to hold the work by suction with higher reliability. In addition, the provision of the metallic material on the inner surface of the suction pad permits the discharge of the static electricity charged on the suction pad through the metallic material. It is therefore possible to prevent the work from being adversely affected by the static electricity charged on the suction pad. For example, it is possible to avoid the damage of any works by the static electricity and the conveyance of a plurality of works in the form of a thin film at once.

Moreover, it is possible to mold all kinds of flexible plastics as antistatic suction pads by using the metallic fiber material.

What is claimed is:

1. An apparatus for holding a work by suction and conveying the work, making use of a suction pad for holding the work by suction, wherein the suction pad comprises a root part connectable to a vacuum and suction source, a skirt part disposed integrally with the root part, and a cushioning part disposed integrally between the root part and the skirt part, said cushioning part further comprising an annular projection joining together an upper portion of the cushioning part and a lower portion of the cushioning part, wherein the hardness of the annular projection is higher than that of the lower portion of the cushioning part.

2. An apparatus as claimed in claim 1, wherein the hardness of at least the cushioning part on a side proximate the root part is higher than that on a side proximate the skirt part.

3. An apparatus as claimed in claim 2, wherein the upper portion of the cushion part gradually expands downward from the side proximate the root part, and the lower portion of the cushion part gradually expands upward from the side proximate the skirt part.

4. An apparatus as claimed in claim 3, wherein the hardness of the annular projection is equal to that of the upper portion of the cushioning part.

5. An apparatus as claimed in claim 1, wherein the hardness of the annular projection is equal to that of the upper portion of the cushioning part.

6. An apparatus as claimed in claim 1, further comprising a positioning means capable of displacing the position of the suction pad itself along an axial direction of the root part.

7. An apparatus as claimed in claim 1, further comprising an adapter fitted in the root part of the suction pad and having a through-hole communicating with a hole bored in the root part, said adapter being molded from a plastic.

8. An apparatus as claimed in claim 7, wherein the material of the adapter is a conductive plastic.

9. An apparatus as claimed in claim 7, wherein the adapter has been plated with a metal.

10. An apparatus as claimed in claim 1, wherein both root part and skirt part of the suction pad are formed of a flexible resin, and a metallic fiber material is incorporated in the flexible resin.

11. An apparatus as claimed in claim 10, wherein the suction pad is integrally molded from the flexible resin composing the root part and skirt part, and the metallic fiber material.

12. An apparatus as claimed in claim 11, wherein a part of the metallic fiber material is exposed out of at least the top of the root part and the inner surface of the skirt part in the suction pad.

13. An apparatus as claimed in claim 1, wherein the metallic fiber material is applied to the inner wall surface defining the through-hole bored in the root part along its axial direction and the inner surface of the skirt part in the suction pad.

14. An apparatus for holding a work by suction and conveying the work, making use of a suction pad for holding the work by suction, wherein the suction pad comprises a root part connectable to a vacuum and suction source, a skirt part disposed integrally with the root part, a cushioning part disposed integrally between the root part and the skirt part, wherein the hardness of at least the cushioning part on a side proximate the root part is higher than that on a side proximate the skirt part, and wherein the cushioning part comprises an upper portion gradually expanding downward from the side proximate the root part, a lower portion gradually expanding upward from the side proximate the skirt part, and an annular projection which joins the upper portion of the cushioning part to the lower portion of the cushioning part, the hardness of the annular projection being higher than that of the lower portion of the cushioning part.

15. An apparatus as claimed in claim 14, wherein the hardness of the annular projection is equal to that of the upper portion of the cushioning part.

16. An apparatus as claimed in claim 14, further comprising a positioning means capable of displacing the position of the suction pad along an axial direction of the root part.

17. An apparatus as claimed in claim 14, further comprising an adapter fitted in the root part of the suction pad and having a through-hole communicating with a hole bored in the root part, said adapter being molded from plastic.

18. An apparatus as claimed in claim 17, wherein the material of the adapter is a conductive plastic.

19. An apparatus as claimed in claim 17, wherein the adapter is plated with a metal.

* * * * *